Figure 1:
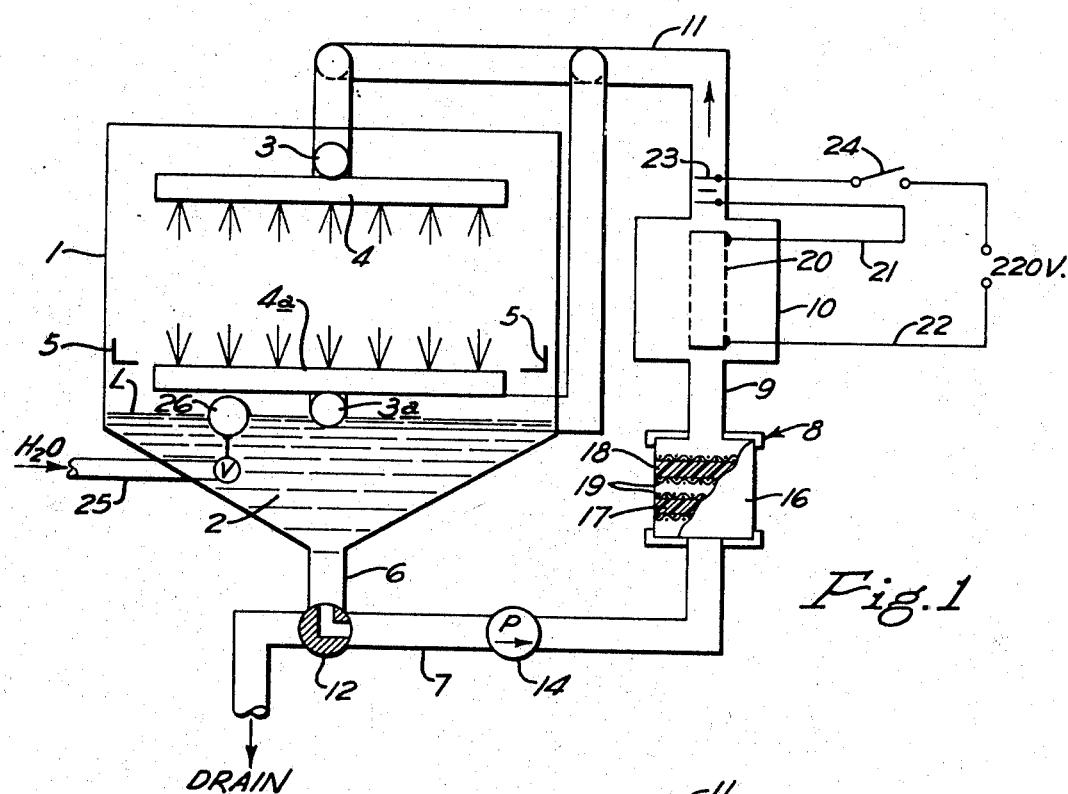

Nov. 4, 1969        A. W. MORGAN, JR., ET AL        3,476,600
                   RINSING MACHINE-WASHED DISHES
                        Filed March 8, 1966

INVENTORS.
ALONZO W. MORGAN, JR.
JOSEPH G. SELMECZI
BY
Brown, Critchlow, Flick & Peckham
ATTORNEYS.

United States Patent Office 3,476,600
Patented Nov. 4, 1969

3,476,600
RINSING MACHINE-WASHED DISHES
Alonzo W. Morgan, Jr., Pittsburgh, and Joseph G. Selmeczi, Bridgeville, Pa., assignors, by mesne assignments, to Ionics Incorporated, Watertown, Mass., a corporation of Massachusetts
Filed Mar. 8, 1966, Ser. No. 532,662
Int. Cl. B08b 3/10
U.S. Cl. 134—10            10 Claims In the machine washing of dishes, glassware, cutlery and other culinary articles, with commercial detergents in restaurants and other establishments in which such articles are washed on a large scale, a perennial problem is the residue of a more or less continuous hazy film and the presence of water spots left on articles as a result of dissolved solids present in the rinse water. This is especially noticeable and objectionable when the final rinse is done with high temperature water, commonly at at least 180° F., as required by municipal and other sanitary ordances or regulations. This problem is aggravated when the final rinse water contains a high amount of dissolved solids, especially temporary hardness. The addition of surfactants to the final rinse water does not always result in better appearance; in fact it sometimes contributes to the problem. These unsightly deposits are more prevalent when the final rinse water is very hot because the sonsequent rapid "flash evaporation" leaves a heavier deposit than when drainage is more complete when water of lower temperature is used.

It is not economically feasible to wipe or polish each individual machine-washed article; in fact this is prohibited by law in some states and municipalities. The difficulties alluded to can be avoided by making the final rinse with distilled or deionized (demineralized) water but this is economically not feasible because the cost of making sufficient distilled water or of deionizing natural waters on a sufficiently large scale for the final rinsing of machine-washed utensils is uneconomical and impractical.

It is among the objects of this invention to provide a method of final rinsing machine-washed utensils with water at the high temperature desired in commercial establishments and which in many areas is fixed at a minimum of 180° F., which is simple, easily practiced, highly effective in avoiding the formation of hazy film and water spots upon the rinsed and dry utensils, does not require elaborate and expensive apparatus or skilled operation, and which does not objectionably increase washing costs as compared with present-day conventional washing and rinsing operations.

A further object is to provide apparatus for use in practicing the method of this invention which may be utilized in connection with or embodied in commercial machine-washing devices, is capable of being operated essentially automatically, or at least with a minimum of care and attention, and the use of which does not impose any appreciable cost burden upon the final rinsing of large quantities of utensils as compared with the operating cost of present-day commercial machine washing apparatus.

Other objects will be recognized from the following description.

Figure 2:
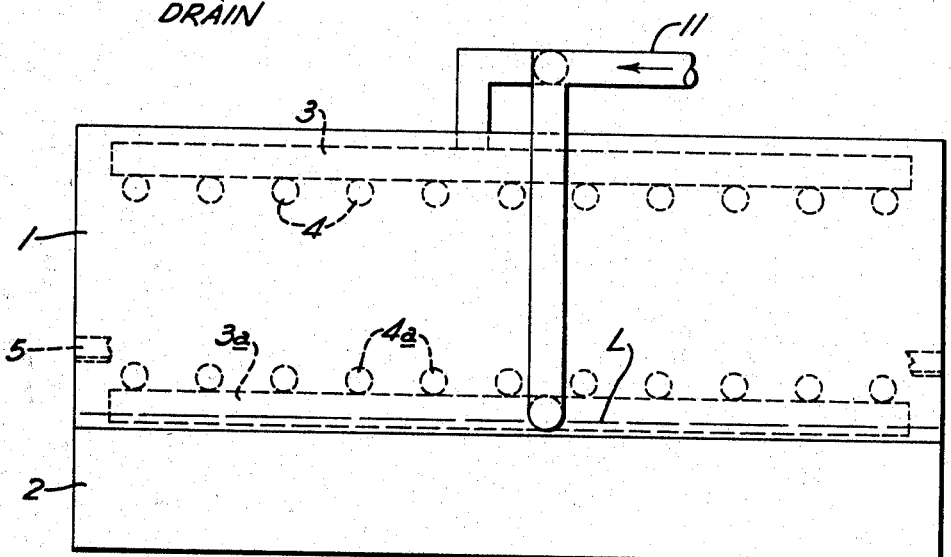

The invention will be described with reference to the accompanying drawings, in which FIG. 1 is a schematic end elevation of apparatus in accordance with and for the practice of the invention, part being broken away for clarity of illustration; and FIG. 2 is a schematic side elevation of the apparatus of FIG. 1.

In accordance with this invention culinary articles are washed and then given a final rinse, most suitably after a pre-rinse, by passing them in the customary open mesh baskets, or trays, to a spray chamber where they are subjected to a spray of hot water, preferably at a temperature of at least 180° F. The water draining from the utensile, the baskets and the interior surfaces of the chamber is colected in a sump below the basket area, from which it is withdrawn by a pump and passed to a deionizing, or demineralizing, unit from which it is passed to a heating unit to maintain it at the desired temperature, and thence t is passed to the spray heads in the spray chamber. Associated with the entrance to the deionizing unit is a connection to the house, or raw, water line that may be actuated by a float device situated at a predetermined level in the sump. When the volume of water in the sump is diminished by evaporation, splash, and carry-out on the rinsed utensile and baskets, the float actuates a valve in the raw water line to restore the amount of water lost. The incoming fresh water then passes through the deionizer together with water being recirculated from the sump. In this way the final rinsing is accomplished with recirculated deionized, or demineralizde, water with the result that the utensile dry rapidly without acquiring objectionable hazy films and water spots.

Turning now to the drawings, there is shown a spray chamber 1 of substantially rectangular section with its lower portion of conical shape, as shown, to provide a sump area 2. Mounted near the top of chamber 1 is a manifold 3 which supplies a series of overhead spray heads 4, and another manifold 3a carrying upwardly directed spray heads 4a. At or adjacent the normal level L of water in the sump angle brackets 5 are mounted along the length of opposite sides of chamber 1 for receiving the baskets, not shown, of pre-rinsed utensils carried by a conveyor, not shown, which are conventional parts of the well-known standard apparatus used for machine-washing of culinary articles. A conduit 6 leads from the lowest portion of sump 2, and a branch conduit 7 passes water withdrawn from the sump to a deionizer unit 8 from which it passes through a pipe 9 to a heating unit 10. Another conduit 11 receives water from the heating unit and passes it to headers 3 and 3a, as shown. Manifold 3a is provided with spray heads 4a. Conduit 6 is provided with a three-way lever actuated plug valve 12, and a pump 14 is provided in conduit 7 for withdrawing water from sump 2 and passing it through the deionizer unit, the heater and conduit 11 to header 3. Valve 12 serves to drain the sump when necessary, and by appropriate setting the sump may be drained while avoiding emptying of the deionizer and heater.

A feature of the invention is that the deionizer combines the effects and benefits of anionic and cationic exchange resins. Preferably the resins are mounted in a readily removable cartridge type device indicated schematically at 16. For the best results the incoming water from the sump is passed downwardly first through a bed 17 of strongly acidic cationic exchange resin and then through a bed 18 of weakly basic anionic exchange resin; thus flotation and separation of the resins is avoided. Preferably also the beds are supported on and separated by screens 19 instead of being mixed together.

The combination of a strong acid and a weak base resin does not remove $CO_2$ from water. Carbonate and bicarbonate alkalinities are converted to $CO_2$, which will leave the water at the time of spray by virtue of low solubility of gases at elevated temperatures. Savings in ion exchange capacity will be realized on the anion exchanger due to the fact that $CO_2$, bicarbonate and carbonate alkalinity will not be exchanged.

The resins should be resistant to the hot water. The resins act to filter off any solid matter.

The heater 10 may take a variety of forms but preferably it consists of an electric immersion unit 20 connected by leads 21 and 22 to a suitable source of electricity, such as a 220 volt line. Mounted within conduit 11 adjacent the outlet from heater 10 is a thermoregulator 23 connected through a switch 24 to the 220 volt source. The thermoregulator is so chosen that as long as the water reaches it at the desired high temperature, the switch remains open but when the temperature falls to the minimum operating temperature it causes the switch to close so that the heater is activated until the temperature of the water circulating in the system has reached the desired value, at which time the switch is opened by the action of the thermoregulator.

A pipe 25 leading from the outside raw water supply is connected to the sump through a conventional float and needle valve 26 which acts to maintain the sump level L.

In the use of the apparatus just described valve 12 is closed and valve 26 acts automatically to pass an amount of water through pipe 25 to bring the water level in sump 2 to its normal level L. Meanwhile, heater 10 is heating the water, and when it reaches the proper degree of heat switch 24 opens. At this point the apparatus is ready to receive baskets of washed, preferably pre-rinsed, culinary utensils which will be sprayed top and bottom by the hot and deionized water through circulation from the sump, through the deionizer, through the heater and through conduit 11 and headers 3 and 3a, with the water collecting in the sump for recirculation as just described.

If at any time it becomes necessary or desirable, the spray chamber and circulating system may be emptied by operating valve 12, and when the apparatus is to be put again to use, this valve is closed and the operation proceeded with as just described.

The spray chamber may be made from any of a number of materials but preferably it is constructed from stainless steel, Monel metal, or similar corrosion resistant material. Also, the system may be provided with a replaceable filter for removal of accumulated solids such as may not have been completely removed in the washing operation but which as a result of it will have become sufficiently softened to be completely removed by the action of the pressure sprayers, for instance in the case of cream pitchers, chocolate cups, gravy boats, and similar articles which acquire hardened deposits through drying before being washed, or which have re-entrant angles that may not be thoroughly reached in the actual washing operation. Likewise, valve 12 may be manually adjusted to drain off continuously a portion of the circulating water to minimize build-up of unionized solids carried by the utensils.

Actual experience has shown that the method of this invention, involving the use of deionized very hot water does, in fact, result in avoidance of visible deposits on the utensils. As a result of recirculation of heated demineralized water, with minimum makeup of water losses, not only is the surface appearance of the finally rinsed articles pleasing, but also there is no problem of accumulation of dissolved and dispersed detergents, and water heating costs are substantially decreased compared with conventional operations where a large amount of water is necessarily heated to rinse each batch of utensils. Further savings result from reduction of sewer tax charges because much less water is discharged to the sewer as compared with conventional rinsing practice.

To minimize loss of water by splash-out, the ends of the spray chamber may be provided, as will be understood, with flexible water-resistant curtains, not shown, that do not impede the entrance and exit of the trays.

Various modifications are possible. Thus, there may be provided a switch controlling the pump and heater so that the unit may be shut down when no trays are passing through. Of course, the unit described may be associated with existing dish-washing machines or it may be made an integral part of a dish-washing machine.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. In a method of washing culinary utensils, the steps comprising machine washing a batch of said utensils, final rinsing them with hot freshly deionized water, collecting the used rinse water and continuously recirculating at least a portion of the same in a heated condition through a deionizer for final rinsing a further batch of washed utensils with said freshly deionized water.

2. A method of final rinsing machine-washed utensils comprising the steps of introducing the washed utensils into a spray chamber for receiving baskets of pre-washed utensils and provided with pressure means for spraying water on the utensils and with collecting means for water sprayed upon the utensils, withdrawing water from said collecting means and passing it first through a bed of cationic exchange resin and then through a bed of anionic exchange resin, then passing the thus deionized water to means for heating it to a temperature conforming to local sanitary requirements, passing the thus heated and deionized water to said spray means, collecting the used rinse water in said collecting means, and continuously recirculating at least a portion of the used water from said collecting means through said exchange resins, heating means and spray means whereby only freshly deionized water contacts the utensils during said final rinse.

3. A method according to claim 2, said utensils being pre-rinsed before being introduced into said spray chamber.

4. A method according to claim 2, said water being heated to at least about 180° F.

5. Apparatus for rinsing machine washed culinary utensils comprising the combination of a spray chamber for receiving and passing through trays of washed utensils, spray means disposed in said chamber for directing rinse water onto said utensils under pressure, a sump associated with said chamber to receive used water draining from the utensils, deionizing means, a conduit connecting said sump with said deionizing means, a heating means associated with the outlet of said deionizing means, a conduit connecting the outlet of said heating means and said spray means, and means for continuously recirculating at least a portion of the used water from the sump through said deionizing means and heater to said spray means.

6. Apparatus according to claim 5, a source of raw water being connected to said sump, and means associated with said sump and said source to maintain a constant volume of water in the system.

7. Apparatus according to claim 5, said heating means being an electric immersion heater.

8. Apparatus according to claim 5, said deionizing means being separate acid exchange and base exchange resins disposed with the base exchange resin container connected to said heating means.

9. Apparatus according to claim 8, said resins being separated from one another.

10. Apparatus according to claim 8, characterized in that the said exchange resins comprise a strongly acidic cationic exchange resin and a weakly basic anionic exchange resin.

References Cited

UNITED STATES PATENTS

| 2,561,631 | 7/1951 | Negri | 134—111 X |
| 2,633,437 | 3/1953 | Detjen | 134—25 |
| 2,825,666 | 3/1958 | Stoddard | 134—25 |

(Other references on following page)

UNITED STATES PATENTS

| | | | |
|---|---|---|---|
| 2,842,144 | 7/1958 | Lyman | 134—111 |
| 3,023,132 | 2/1962 | Diamond | 134—10 |
| 3,034,933 | 5/1962 | Richards | 134—32 X |
| 3,062,739 | 11/1962 | Crits | 210—34 X |
| 3,074,078 | 1/1963 | Varian | 134—111 X |
| 3,147,215 | 9/1964 | Blight | 210—30 X |

MORRIS O. WOLK, Primary Examiner
SIDNEY MARANTZ, Assistant Examiner

U.S. Cl. X.R.

134—10, 25, 57, 111, 115; 210—24